United States Patent [19]

Watanabe et al.

[11] Patent Number: 5,189,650
[45] Date of Patent: Feb. 23, 1993

[54] MAGNETO-OPTICAL SIGNAL REPRODUCING APPARATUS IN WHICH REPRODUCED MAGNETO-OPTICAL SIGNAL LEVEL IS COMPARED WITH REFERENCE SIGNAL LEVEL VARIED IN ACCORDANCE WITH IN-PHASE SIGNAL

[75] Inventors: Tetsu Watanabe, Tokyo; Tamotsu Yamagami; Tetsuji Kawashima, both of Kanagawa, all of Japan

[73] Assignee: Sony Corporation, Tokyo, Japan

[21] Appl. No.: 617,803

[22] Filed: Nov. 26, 1990

[30] Foreign Application Priority Data

Nov. 29, 1989 [JP] Japan .................. 1-310353

[51] Int. Cl.$^5$ .................. G11B 13/04; G11B 11/12; G11B 11/10
[52] U.S. Cl. .................. 369/13; 360/114; 360/59; 369/116; 369/110
[58] Field of Search .................. 369/13, 47, 48, 116, 369/124, 110, 109; 360/59, 114

[56] References Cited

U.S. PATENT DOCUMENTS

| | | |
|---|---|---|
| 3,720,923 | 3/1973 | Minnetonka et al. .......... 350/160 R |
| 4,688,203 | 8/1987 | Koishi et al. .................. 369/54 |
| 4,719,612 | 1/1988 | Kenjyo .......................... 369/124 |
| 4,730,289 | 3/1988 | Saitoh et al. .................. 369/13 |
| 4,774,698 | 9/1988 | Henmi et al. .................. 369/13 |
| 4,807,210 | 2/1989 | Kaku et al. .................... 369/13 |
| 4,833,622 | 5/1989 | Yoda ............................. 369/13 |
| 4,858,218 | 8/1989 | Takagi et al. .................. 369/13 |
| 4,961,182 | 10/1990 | Saito et al. .................... 369/124 |

FOREIGN PATENT DOCUMENTS

| | | |
|---|---|---|
| 322817 | 12/1988 | European Pat. Off. . |
| 61-237247 | 10/1986 | Japan ............................ 369/13 |
| 1-165037 | 6/1989 | Japan . |

Primary Examiner—Hoa Nguyen
Attorney, Agent, or Firm—Alvin Sinderbrand; William S. Frommer

[57] ABSTRACT

In a magneto-optical signal reproducing apparatus for reading out a signal recorded on a magneto-optical recording medium by an optical pickup device so as to provide a magneto-optical signal which, in turn, is level-discriminated on the basis of a reference level to reproduce data therefrom, the reference level is controlled in accordance with a level of an in-phase signal component provided from the optical pickup device, thereby enabling stable data reproduction.

7 Claims, 3 Drawing Sheets

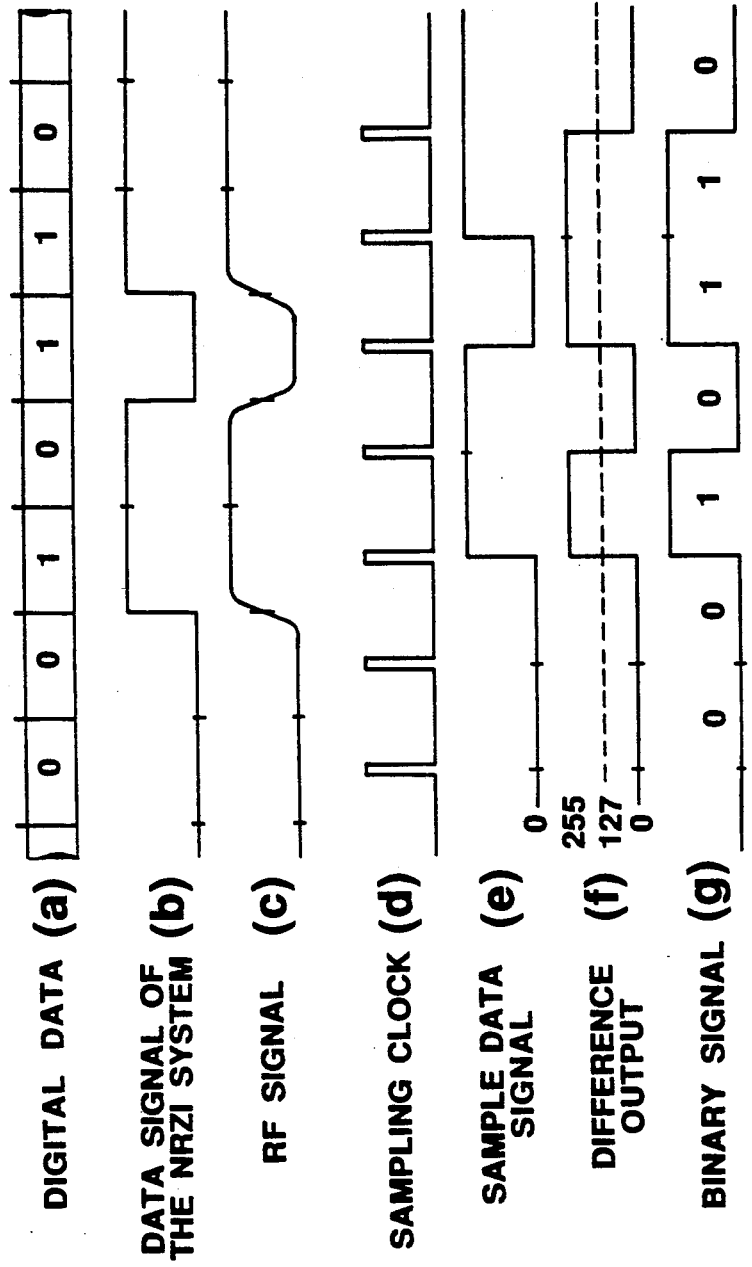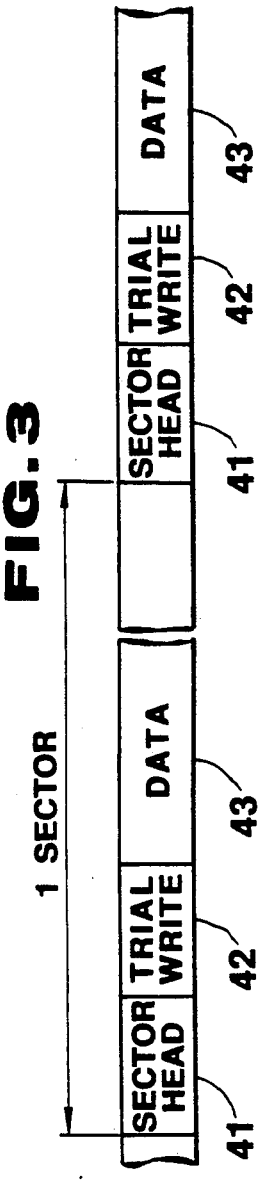

MAGNETO-OPTICAL SIGNAL REPRODUCING APPARATUS IN WHICH REPRODUCED MAGNETO-OPTICAL SIGNAL LEVEL IS COMPARED WITH REFERENCE SIGNAL LEVEL VARIED IN ACCORDANCE WITH IN-PHASE SIGNAL

BACKGROUND OF THE INVENTION

1. Field of the Invention

This invention relates to a magneto-optical signal reproducing apparatus for reproducing data from a magneto-optical signal obtained from a magneto-optical recording medium.

2. Related Art Statement

In the prior art, data are reproduced from a magneto-optical recording medium, for example, a magneto-optical disk, by focusing a laser beam on the magneto-optical recording medium. A reflected light or a transmitted light is thereafter detected by means of a photo detector, included in an optical pickup device. A difference between detected polarized light components, which are different from each other, provides a magneto-optical signal. This magneto-optical signal is level-discriminated on the basis of a predetermined reference level, or a threshold level, to provide a binary signal which is demodulated/decoded so as to reproduce the data therefrom.

If the level of a signal detected by the photo detector of the optical pickup device changes due to defects related to the recording medium which, for example, may be caused by disturbances at the time of recording or reproducing, or the like, there is a possibility that the level discrimination utilized in forming the binary signal, or the binarization thereof, is not properly conducted.

For this reason, in the prior art, the magneto-optical signal provided from the optical pickup device is delivered to an AGC (automatic gain control) circuit for conducting an automatic gain control thereon. However, in the case of a magneto-optical storage disk, a signal stored thereon typically has a broad frequency band which, for example, may be between 10 Hz and 20 MHz. As a result, a high speed AGC is required which, in turn, results in a relatively complicated circuit configuration and/or increased cost.

OBJECTS AND SUMMARY OF THE INVENTION

Accordingly, it is an object of the present invention to provide a magneto-optical signal reproducing apparatus which avoids the above-mentioned disadvantages of the prior art.

More specifically, it is an object of the present invention to provide a magneto-optical signal reproducing apparatus having a simple circuit configuration which is adapted to permit normal reproducing of data regardless of changes in the level of the magneto-optical reproducing signal.

According to an aspect of the present invention, a magneto-optical signal reproducing apparatus for reproducing a data sequence recorded on a magneto-optical recording medium comprises:

an optical pickup device for optically reading a signal recorded on the recording medium and for generating a magneto-optical signal and an in-phase signal;

a reference level generating device for generating a reference level signal in accordance with at least the in-phase signal from the optical pickup device; and a device for level-discriminating the magneto-optical signal relative to the reference level signal so as to provide a binary output which corresponds to the data sequence.

A magneto-optical signal reproducing apparatus according to this invention is adapted to read out a signal recorded on a magneto-optical recording medium by means of an optical pickup device and, as a result thereof, to provide a magneto-optical signal which, in turn, is level-discriminated on the basis of a predetermined reference level so as to reproduce the data therefrom, wherein the reference level is controlled in accordance with the level of at least an in-phase signal component provided from the optical pickup device.

Thus, since the discriminative reference level is varied in dependency upon the level of an in-phase signal component, reproducing data stable with respect to changes in the level can be conducted with a relatively simple circuit configuration.

The above, and other objects, features and advantages of the present invention will be apparent in the following detailed description of an illustrative embodiment when read in conjunction with the accompanying drawings.

BRIEF DESCRIPTION OF THE DRAWINGS

FIGS. 2(a)-(g) are time charts for explaining the binarization operation;

FIG. 3 is a diagram of a recording format; and

DESCRIPTION OF THE PREFERRED EMBODIMENT

Figure 1:
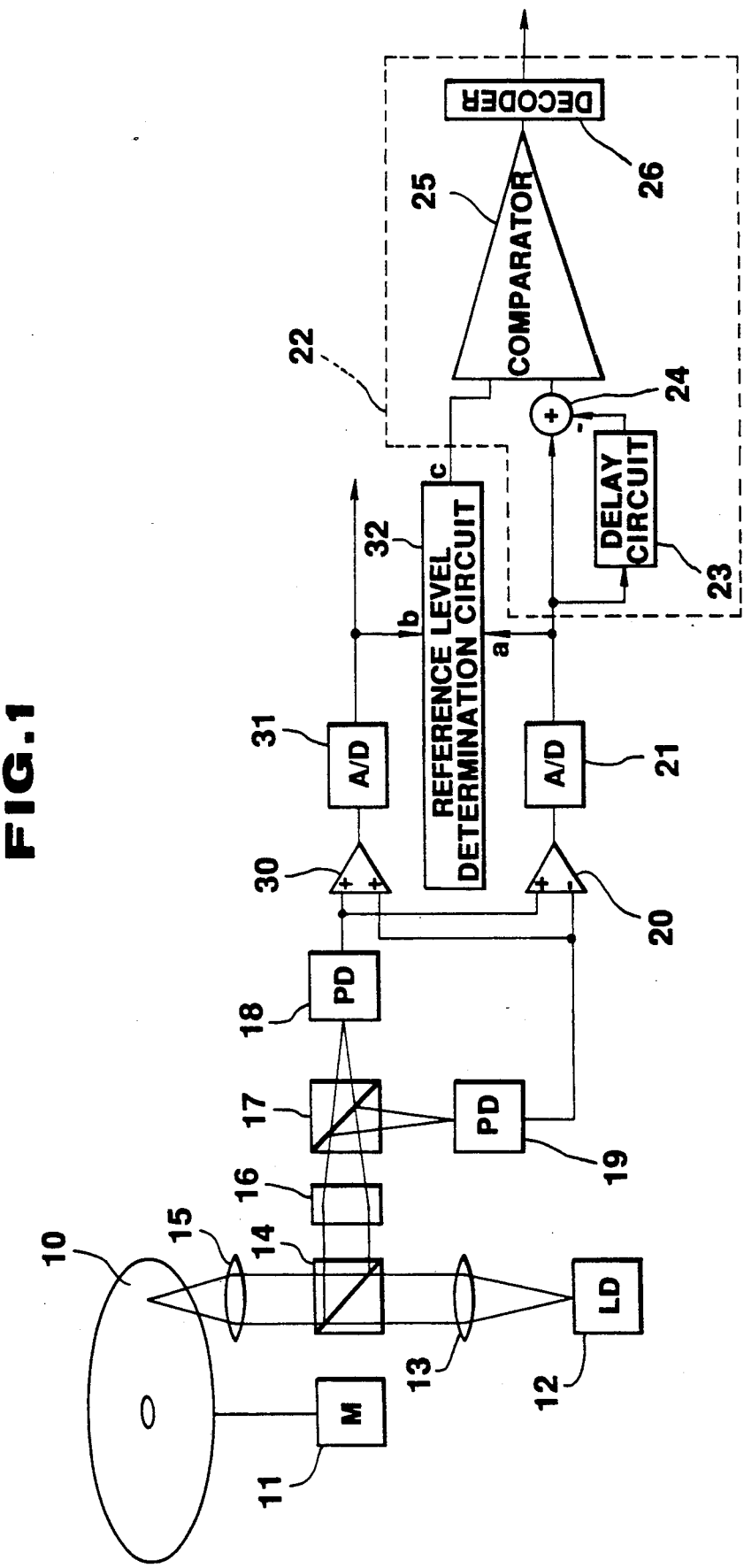
FIG. 1 is a block diagram of a magneto-optical signal reproducing apparatus according to an embodiment of the present invention.

FIG. 1 is a circuit diagram, in a block form, of a magneto-optical signal reproducing apparatus according to an embodiment of the present invention.

A magneto-optical disk 10, shown in FIG. 1, may be constructed such that, a perpendicular magnetic anisotropic film having the magneto-optical effect is formed on a transparent substrate. This magneto-optical disk 10 is rotationally driven by a spindle motor 11 at a constant linear velocity (CLV) or a constant angular velocity (CAV). A laser beam from a laser light source 12, for example, a laser diode, is changed to a parallel light beam by a collimator lens 13, and is then irradiated onto the magneto-optical disk 10 through a beam splitter 14 and an object lens 15 of a biaxial device utilized for focusing and tracking. A reflected light beam from the magneto-optical disk 10 is split by the beam splitter 14, and is then incident on a polarization beam splitter 17 by way of a optical system 16 which, for example, may include a half-wave plate, a focusing lens, and a cylindrical lens. At the polarization beam splitter 17, the reflected light beam incident thereon is split into a P-polarized light component and a S-polarized light component. Each component is incident on one of the photo detectors 18 and 19 whereupon a tracking error signal, a focus error signal, and a magneto-optical signal (MO signal) are detected.

Output signals from photo detectors 18 and 19 are supplied to non-inverting and inverting inputs, respectively, of a differential amplifier 20 so as to generate a difference signal. As a result, an information signal, or magneto-optical (MO) signal component, which is recorded magneto-optically, is extracted. The magneto-optical signal supplied from the differential amplifier 20 is converted to a corresponding digital signal a at an A/D converter 21 and such digital signal is supplied to a record information (data) reproducing circuit 22.

Output signals from the photo detectors 18 and 19 are further supplied to a summing amplifier 30 so as to generate a sum signal which corresponds to an in-phase signal component, that is, a signal component based on the detection of changes in the coefficient of reflection caused by, for example, pits or grooves. The in-phase signal component from the summing amplifier 30 is converted to a digital signal b at an A/D converter 31. The digital signal b thus obtained is used for tracking control and is also delivered to a reference level determination circuit 32 which, for example, may be constituted by a microcomputer. A discrimination level or threshold value c, used for reproducing the data, which will be described hereinafter, is controlled in dependency upon the level of at least the in-phase signal component represented by the digital signal b.

As is to be appreciated, the data reproducing circuit 22 for the magneto-optical signal may be implemented in a variety of configurations. As an example, the data reproducing circuit 22 of this embodiment provides a circuit which level-discriminates a difference output signal by providing level differences every clock pulse of the magneto-optical signal on the basis of a predetermined threshold value. More specifically, the magneto-optical digital signal a delivered to the data reproducing circuit 22 is delayed by a delay circuit 23. The signal thus delayed is subtracted from the original magneto-optical digital signal by an adder 24 which acts as a subtracter, thus providing a difference signal every clock pulse. The difference output signal from the subtracter 24 is supplied to a comparator 25, at which level discrimination is performed using the reference level c from the reference level determination circuit 32 as a threshold value. As a result, a binary output signal is produced which is supplied to a decoder 26 so as to demodulate or decode the binary signal, thereby reproducing the record information data.

As stated above, the threshold value used in the data reproducing circuit 22 is the reference level c generated by the reference level determination circuit 32 and supplied there from. This reference level varies in accordance with the level of at least the in-phase signal component b. The level of the in-phase signal component b may be affected, in a manner similar to that which affects the magneto-optical signal, by defects in the magneto-optical disk 10, which serves as a recording medium, which specifically, defects in the recording medium which, as previously mentioned, may be caused by disturbances at the time of recording or reproducing, may be detected by the reflected light beam from the disk 10 and processed as hereinbefore described. As a result, the level or value of the in-phase component b may change due to such defects. However, the reference level c varies in accordance with such level changes in the in-phase component b. By varying with level changes in at least the in-phase signal component b, the threshold value c, also effectively varies with changes in the level of the magneto-optical signal. As a result, stable data reproduction may be obtained.

The configuration of the data reproducing circuit 22 of FIG. 1 is disclosed in the specification and the drawings of the Japanese Patent Application No. 225318/89 which was filed by the present applicant. This circuit configuration is particularly adapted for edge detection of an edge-recorded signal. More specifically, assume a digital data train, for example, as shown in FIG. 2(a), is to be edge-recorded. When this data train is converted to a signal, for example, a signal of the NRZI system as shown in FIG. 2(b), which is recorded on a magneto-optical disk and reproduced by an optical pickup device, a waveform distortion, for example, as shown in FIG. 2(c) or a D.C. drift and the like due to the superposition of a D.C. component, may be produced in the magneto-optical signal. The magneto-optical signal thus obtained is sampled by a sampling clock pulse shown in FIG. 2(d) using, for example, a synchronization clock, and is subjected to A/D conversion by A/D converter 21 of FIG. 1. As a result, a digital sample data signal as shown in FIG. 2(e) is provided. The sample data signal and a signal one sample before is supplied to the adder 24, whereupon a difference output signal as shown in FIG. 2(f) is provided. By level-discriminating the difference output signal of FIG. 2(f) using a predetermined level, for example, an intermediate level of 127 when the level range is from 0 to 255, as a threshold value at the comparator 25, a binary signal as shown in FIG. 2(g) is provided. Thus, the apparatus in accordance with the above-described embodiment of the present invention, in providing a difference between respective signals sampled by a synchronization clock, and level-discriminating this difference on the basis of a reference level, makes it possible to precisely form a binary signal without increasing a high frequency noise component and tolerates a D.C. drift so as to cope with even a modulated waveform which has a DC component. The above-mentioned synchronization clock may be provided by detecting a synchronous bit in the servo area of an optical disk of the sample servo system which provides synchronization of the PLL circuit, or may be provided by extracting a clock component of a signal of the self-clock system.

In the embodiment shown in FIG. 1, the digitalized magneto-optical signal a from the A/D converter 21 is also supplied to the reference level (threshold value) determination circuit 32 for use by the latter in initializing the reference level (threshold value) by detecting a level of a magneto-optical signal in a trial write area 42 contained within every sector of the recording format as shown in FIG. 3. More specifically, FIG. 3 shows an example of a recording format of the track of the magneto-optical disk 10. As shown in FIG. 3, a preamble area or a sector head area 41 is provided at the leading position of each sector of the recording track, and the trial write area 42 is provided between the sector head area 41 and a data recording area 43. This trial write area 42 is typically utilized for recording predetermined monitor data or a pattern at the time of data recording so as to monitor the laser power intensity or to adjust a clock phase of record data in the case of the sample servo system. In addition to the above, in this embodiment, predetermined data or a pattern may be magneto-optically recorded at the time of data recording to be also used for initialization of the threshold level of the magneto-optical signal. However, in an alternate embodiment, only the trial write area 42 may be employed for initialization of the threshold level.

The data recorded in the trial write area 42 and the data recording area 43 of each sector may be thereafter reproduced. In this reproduction, since the data in the trial area 42 precedes the data in the data recording area 43 for each respective sector, as shown in FIG. 3, the data in the trial area is reproduced before that in the data recording area. From such reproduction, the reference level may be determined as will now be described. In this discussion, levels $a_1$, $b_1$ and $b_2$, $c_1$ and $c_2$, merely indicate values of the signal a, in-phase signal component b and reference level c, respectively, and, as such, do not represent new additional signals.

Figure 4:
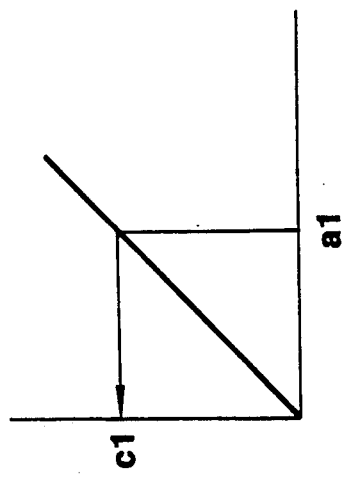

During the reproducing or scanning of the trial write area 42, a level $a_1$, which represents the value of the magneto-optical digital signal a provided from the A/D converter 21 when the trial write area 42 is scanned, is detected and supplied to the reference level determination circuit 32 so as to determine a reference level $c_1$ (or a reference level control signal), which is the value of the referenced level signal c obtained during the scanning of the trial write area 42. This reference level $c_1$ has a substantially linear relationship substantially proportional to the magneto-optical signal level $a_1$ as shown in FIG. 4. Accordingly, reference level $c_1$ can be relatively easily determined. The reference level $c_1$ from the reference level determination circuit 32 is supplied, as a discriminative threshold value, to the comparator 25 for level-discrimination and formulation of a binary signal. Further, a level $b_1$, which represents the value of the in-phase signal component b obtained during the time of scanning the trial write area 42, from the A/D converter 31 is supplied to the reference level determination circuit 32 for storage therein so as to be used in determining a reference level value $c_2$ obtained during the scanning of the data area 43 as hereinafter described. Furthermore, during the scanning of the data area 43, the value of the in-phase signal component b is represented by $b_2$.

During reproducing, in particular, at the time of scanning of the data area 43, the reference level $c_2$, which is the discriminative threshold value, may be determined, for example, by the equation expressed below:

$$c_2 = a_1 \times f(b_2/b_1)$$

in which the levels $b_2$ and $b_1$ of the in-phase signal component are provided from the A/D converter 31 during the scanning of the data area 43 and during the scanning of the trial write area 42, respectively, as previously described. In other words, the reference level determination circuit 32 determines the value $c_2$ of the reference level signal in accordance with at least the in-phase signal component. This is, during the scanning of each data area 43, the reference level determination circuit 32 determines the value $c_2$ as the product of the magneto-optical signal having the value $a_1$ obtained from the signal trial-recorded on the preceding trial writing area 42 and a function f of the quotient of the in-phase signal $b_1$ obtained from the signal recorded on the preceding trial writing area 42 and the in-phase signal $b_2$ obtained from the signal recorded in the data area 43 being scanned, as expressed in the above equation. Thus, the value $c_2$ of the discriminative threshold value varies in dependence upon the changes in the value $a_1$ of the magneto-optical signal obtained during the scanning of the preceding trial writing area 42.

Figure 5:
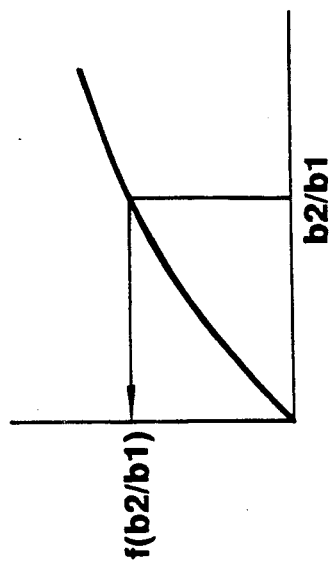
FIGS. 4 and 5 are graphs for explaining the reference level determination operation.

In the above equation, $f(b_2/b_1)$ is expressed as a functional relationship as, for example, shown in FIG. 5, and is primarily based on a characteristic of the optical system. To determine $f(b_2/b_1)$ from the value $b_2/b_1$, a procedure may be used in which an approximate function is prepared from the measurement data, the value of $f(b_2/b_1)$ may be calculated by computational processing, or a ROM table may be implemented to provide the data conversion processing. In the case of utilizing a ROM table, it is possible to prepare such a table so as to permit direct conversion to the reference level $c_2$ from the value $b_2/b_1$ and to output the same.

As stated hereinbefore, by controlling the binary discrimination level (the reference level) during the reproducing of data of the magneto-optical signal on the basis of the magneto-optical signal level $a_1$ and the in-phase signal level $b_1$ in the trial write area 42 and the in-phase signal level $b_2$ in the data area 43, even if the magneto-optical signal level varies as a result of medium defects in the data area 43, the binary discrimination level similarly varies. Thus, a stable binarization operation can be secured by use of a relatively simple configuration.

The binarization circuit in the data reproducing circuit may be configured to directly level-discriminate an input magneto-optical signal using the reference level as a threshold value. In addition to the above, various other binarization circuit configurations may be adopted. Further, the reference level $c_1$ corresponding to the magneto-optical signal level $a_1$ in the trial write area 42 may be used for the entire respective sector. Furthermore, various media, such as a magneto-optical card, may be used instead of the magneto-optical disk as the magneto-optical recording medium.

Although a preferred embodiment of the present invention and various modifications have been described in detail herein, it is to be understood that this invention is not limited to the specifically described embodiment and modifications and that other modifications and variations may be effected therein by one skilled in the art without departing from the spirit and scope of the invention as defined by the appended claims.

What is claimed is:

1. A magneto-optical signal reproducing apparatus for reproducing a binary data sequence included in a signal recorded in a data area on a magneto-optical recording medium, said apparatus comprising:
   optical pickup means including means for optically reading said signal recorded on said recording medium and means for generating a magneto-optical signal and an in-phase signal from the signal read by said means for optically reading;
   reference level determination means for generating a reference level signal in accordance with at least said in-phase signal from said means for generating; and
   reproducing circuit means including means for comparing levels of said magneto-optical signal and of said reference level signal and, in response to such comparison, providing a binary output which corresponds to said binary data sequence.

2. The magneto-optical signal reproducing apparatus according to claim 1; wherein said means for generating comprises:
   a pair of photo detectors for respectively detecting different polarized light components included in light reflected from said magneto-optical recording medium obtained from said means for optically reading, said photo detectors providing respective detection signals, means for subtracting said detection signals from each other and for outputting a differential signal therefrom as said magneto-optical signal, and means for adding said detection signals together and for outputting a sum signal therefrom as said in-phase signal.

3. A magneto-optical signal reproducing apparatus for reproducing a binary data sequence included in a signal recorded in a data area on a magneto-optical recording medium, said apparatus comprising:

optical pickup means for optically reading said signal recorded on said recording medium and for generating a magneto-optical signal and an in-phase signal;

converting means for sampling said magneto-optical signal and said in-phase signal at a predetermined sampling rate having a corresponding sampling period so as to obtain a digital magneto-optical signal and a digital in-phase signal, respectively;

reference level determination means for generating a reference level signal in accordance with at least said digital in-phase signal from said converting means; and reproducing circuit means including delay means for delaying said digital magneto-optical signal by one said sampling period, a subtracter for subtracting the magneto-optical signal delayed by said one sampling period from said magneto-optical signal so as to provide a corresponding output signal therefrom, and means for comparing levels of said output signal from said subtracter and of said reference level signal and, in response to such comparison, for providing a binary output which corresponds to said binary data sequence.

4. A magneto-optical signal reproducing apparatus for reproducing a binary data sequence included in a trial signal recorded in a trial writing area on a magneto-optical recording medium and for reproducing a binary data sequence included in a data signal recorded in a data area on said magneto-optical recording medium, in which said trial writing area precedes said data area, said apparatus comprising:

optical pickup means for optically reading said trial signal and said data signal recorded on said recording medium and for generating from each a respective magneto-optical signal and an in-phase signal;

reference level determination means for generating a reference level signal in accordance with the in-phase signal obtained from said data signal from said optical pickup means and the magneto-optical signal and in-phase signal obtained from said trial signal from said optical pickup means, in which said reference level signal is initialized in accordance with the magneto-optical signal obtained from said trial signal from said optical pickup means; and reproducing circuit means including means for comparing levels of said magneto-optical signal obtained from said data signal and of said reference level signal and, in response to such comparison, providing a binary output which corresponds to said binary data sequence.

5. The magneto-optical signal reproducing apparatus according to claim 4; in which said optical pickup means includes laser means for generating a laser beam.

6. The magneto-optical signal reproducing apparatus according to claim 4; in which said reference level determination means generates said reference level signal as a product of said magneto-optical signal obtained from said trial signal recorded on said trial writing area and a function of a quotient of said in-phase signal obtained from said trial signal recorded on said trial writing area and said in-phase signal obtained from said data signal recorded on said data area of said magneto-optical recording medium.

7. The magneto-optical signal reproducing apparatus according to claim 6; in which said reference level determination means stores said function therein.

* * * * *